United States Patent Office 2,971,441
Patented Feb. 14, 1961

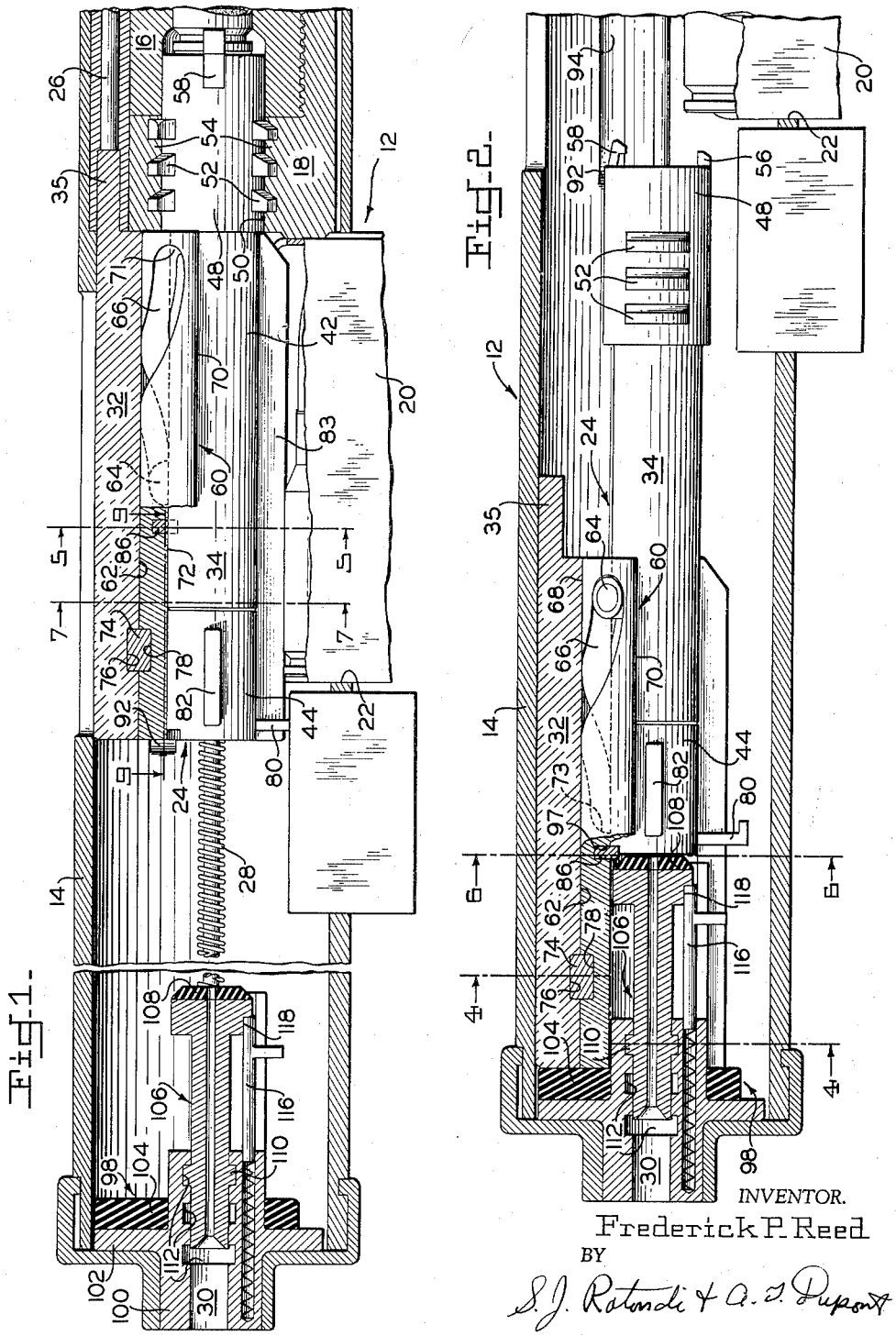

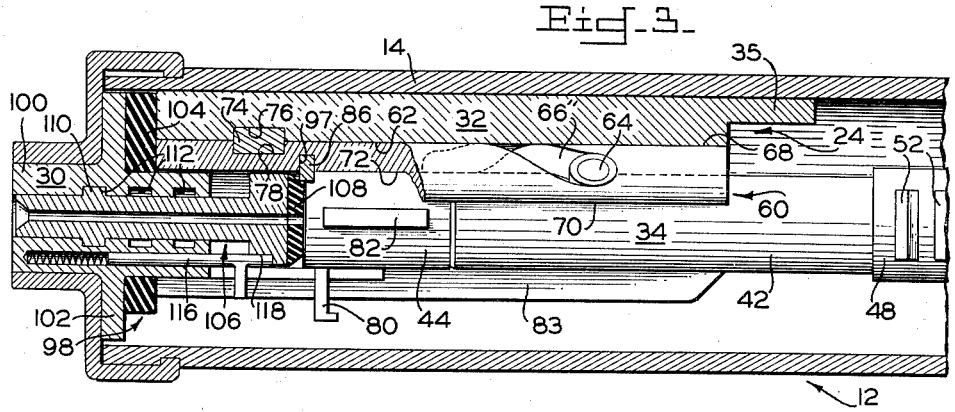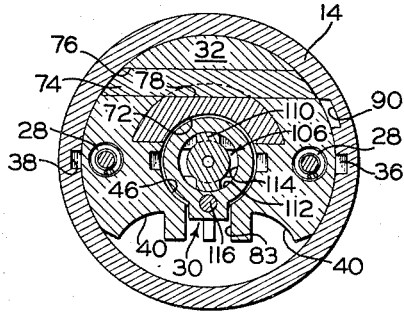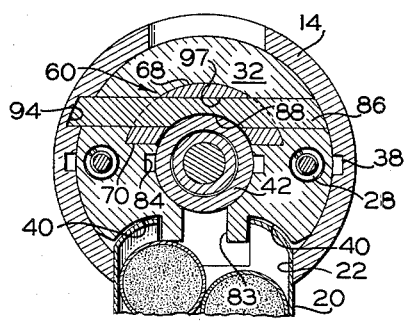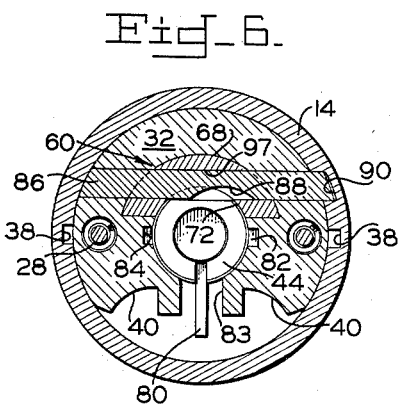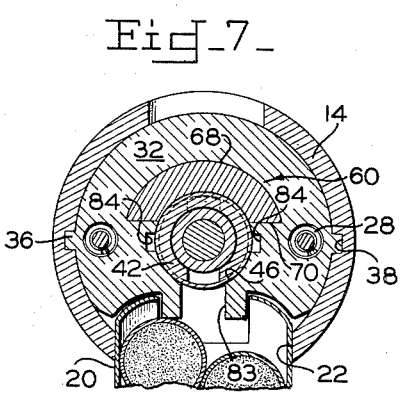

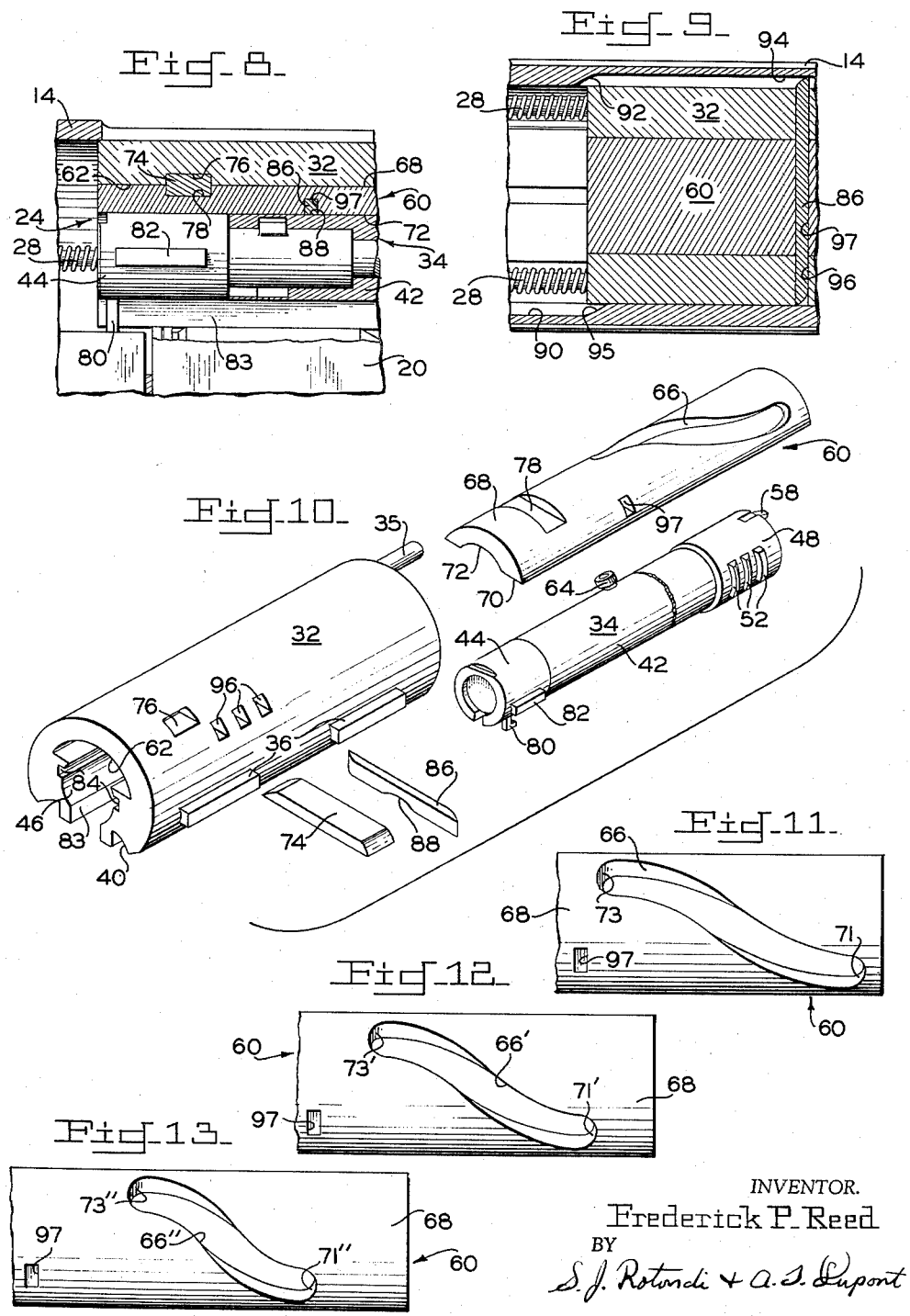

2,971,441

FIRE RATE CONTROL MEANS FOR A TELESCOPIC-TYPE TWO-PIECE FIREARM BOLT

Frederick P. Reed, Ludlow, Mass., assignor to the United States of America as represented by the Secretary of the Army Filed Jan. 22, 1959, Ser. No. 788,474

10 Claims. (Cl. 89—130)

(Granted under Title 35, U.S. Code (1952), sec. 266)

The invention described herein may be manufactured and used by or for the Government for governmental purposes without the payment of any royalty thereon.

This invention relates to firearms and more particularly to those firearms which are provided with bolt mechanisms in which the bolt member is telescopically mounted in a sliding carrier and is cammingly engaged to the carrier so as to be rotatable to and from a lock position during longitudinal movement relative thereto.

Those bolt mechanisms which are composed of a carrier disposed for sliding reciprocation in a firearm receiver and a bolt member which is telescopically mounted in the carrier and is cammingly engaged to the carrier for rotation between a lock and an unlock position during longitudinal movement relative thereto are found desirable in many types of automatic and semiautomatic firearms as such a mechanism provides a symmetrical structure which is symmetrically actuated around the axis thereof to produce a smooth operation.

The use of such a bolt mechanism, however, is hindered because of the difficulty which is encountered in machining the cam slot in the carrier member. In order to form the cam slot so as not to remove so much material that the carrier is weakened thereby and so that dirt will not readily enter therein to cause malfunction of the firearm, the cam slot is preferably formed in the wall of the bore which rotatingly receives the bolt member rather than by "cut-through" methods whereby the cam slot is cut through the carrier from the outside thereof to the bore. However, it is difficult to machine the cam slot in the wall of such bore because sufficient space cannot be provided for the entry of a machining tool into the bore without reducing beyond desirable limits the supporting structure for the bolt as the cam slot should progress helically through an angle of 45° to properly rotate the bolt between a lock and an unlock position.

Moreover, with such bolt mechanisms the cam slot is subject to considerable wear and, consequently, requires a frequent replacement of the carrier member which is expensive to manufacture. It is also necessary to fabricate the carrier from material having sufficient hardness and toughness for the cam slot to withstand as much as possible the wear and pounding received from the follower received therein.

Such mechanisms, too, require intricate and complicated devices for adjusting the firing rate of the firearm and such devices usually have to be installed in the firing mechanism which usually complicates an already intricate mechanism.

It is, therefore, an object of this invention to provide a bolt mechanism of the above-mentioned type in which the cam slot for rotating the bolt member to and from lock position is formed by "cut-through" machining in an insert which is replaceably installed within the carrier so that such cam slot may be easily and inexpensively machined with the engaging areas of the carrier acting as a cover to prevent dirt and debris from entering the slot to cause malfunction of the bolt mechanism.

It is another object of this invention to provide in such a bolt mechanism a cam slot which is formed in a cam insert which is replaceable in the carrier when the cam slot is worn or damaged without having to replace the entire carrier.

It is still another object of this invention to provide in a bolt mechanism of the above-stated type a cam slot which is formed in a replaceable insert so that the supporting carrier my be fabricated from a different type of metal.

It is a further object of this invention to provide a simple yet effective way for regulating the firing rate of a firearm by selectively installing in the carrier cam inserts having cam slots of different predetermined pitches so as to control the velocity of the carrier during the reciprocation thereof in the firearm receiver and thereby the firing rate.

It is still another object of this invention to provide an adjustable means for releasably locking the bolt member to the carrier to compensate for the differences in the lengths of the cam slots.

It is a still further object of this invention to provide a buffer mechanism for stopping the recoil flight of the bolt mechanism which is adjustable to the selected lock position of the bolt member so that the bolt member contacts the buffer mechanism simultaneously with the contact of the carrier therewith so as to reduce the inertial impact between the cam follower mounted to the bolt member and the end of the cam slot.

The specific nature of the invention as well as other objects and advantages thereof will clearly appear from a description of a preferred embodiment as shown in the accompanying drawings in which:

Fig. 1 is a longitudinally cross-sectioned side view of a firearm with the bolt assembly adapted for rapid fire and disposed in locked battery position;

Fig. 2 is a view similar to Fig. 1 but showing the bolt assembly disposed in the recoil position;

Fig. 3 is a view similar to Fig. 2 but with the bolt assembly adapted to fire at a slow rate;

Fig. 4 is a view taken along line 4—4 of Fig. 2;

Fig. 5 is a view taken along line 5—5 of Fig. 1;

Fig. 6 is a view taken along line 6—6 of Fig. 2;

Fig. 7 is a view taken along line 7—7 of Fig. 1;

Fig. 8 is a longitudinally cross-sectioned side view showing the rear end of the bolt;

Fig. 9 is a view taken along line 9—9 of Fig. 1;

Fig. 10 is a reduced exploded view of the bolt assembly shown in perspective;

Fig. 11 is a top view of the cam slot designed to regulate the firearm for firing at a rapid rate;

Fig. 12 is a view similar to Fig. 11 but showing the cam slot designed to regulate the firearm for firing at a medium rate; and Fig. 13 is a view similar to Figs. 11 and 12 but showing the cam slot designed to regulate the firearm for firing at a slow rate.

Shown in the figures is an automatic firearm 12 having a cylindrical receiver 14 to the front end of which there is mounted a barrel 16 provided with an extension member 18 secured to the rear end thereof. A cartridge magazine 20 extends upwardly into receiver 14 through an accommodating port 22 so that the stored cartridges may be stripped from the magazine and transferred to barrel 16 by a bolt assembly 24. Such bolt assembly is slidingly disposed in receiver 14 for reciprocation over magazine 20 between contacts with extension member 18 and a buffer mechanism 30 mounted in the rear end of the receiver. Bolt assembly 24 is energized for such reciprocation by an operating rod 26 which is actuatable rearwardly against the bolt assembly by forces produced when a cartridge is discharged in barrel 16.

Bolt assembly 24 includes a cylindrical carrier 32 which has a diameter substantially similar to that of the inside of receiver 14 so as to be slidable therein and a two-part bolt 34 which is telescopically disposed in the carrier as hereinafter described. A stud 35 extends forwardly from carrier 32 for engagement by operating rod 26, and a pair of compressible coil springs 28 are disposed between carrier 32 and buffer assembly 30 to return bolt assembly 24 to a locked battery position. Ribs 36 extend oppositely from carrier 32 along the lateral plane thereof to be slidingly received by mating longitudinal channels 38 disposed along the inside wall of receiver 14 for restraining rotational displacement of carrier 32 during the longitudinal reciprocation thereof. The underside of carrier 32 is cut away to form a clearance 40 therealong for receiving the upper end of magazine 20 during the travel of the carrier thereover so that bolt 34 may contact the base of the top one of the cartridges in the magazine to transfer such cartridge therefrom to barrel 16.

Bolt 34 is composed of a front member 42 and a rear member 44 which are joined for relative rotational movement but so as to be restrained from relative longitudinal displacement. Both front member 42 and rear member 44 are cylindrical in configuration and are mounted in the front portion of an axial bore 46 extending through carrier 32 so as to be longitudinally slidable therein with front member 42 being rotatable between a lock and an unlock position.

Provided on the front end of front member 42 is a head portion 48 which is extendable through an axial opening 50 in barrel extension member 18 so as to chamber a cartridge in barrel 16 and close the breech end thereof when bolt 34 is in a battery position. Extending diametrically from head portion 48 are bayonet lugs 52 which are engageable with mating bayonet lugs 54 in opening 50 when front member 42 is in the lock position but are disengaged therefrom when the front member is rotated 45° to the unlock position.

A rammer 56 for transferring the cartridges from magazine 20 into barrel 16 extends forwardly from the outer periphery of head portion 48 and is disposed so as to contact the base of the top one of the cartridges in magazine 20 when front member 42 is in the unlock position. An extractor 58 is mounted on head portion 48 diametrically opposite rammer 56 for extracting fired cases from barrel 16.

Front member 42 is rotated between the lock and unlock positions during relative longitudinal movement between bolt 34 and carrier 32 by a selected one of a plurality of cam inserts 60 which are fully described hereinafter. The selected one of the cam inserts 60 is replaceably mounted in carrier 32 above bolt 34 by means of a mating recess 62, which interrupts the upper periphery of bore 46, so that a follower 64 mounted to front member 42 is engageable with a cam slot such as is noted by 66, 66' and 66'' in Figs. 11, 12 and 13, respectively, in the selected cam insert.

The cam inserts 60 are all of the same size so as to be interchangeably received by recess 62 and in the present embodiment they are limited to three. Each of the cam inserts is substantially segmental in configuration and includes an arcuate upper perimeter 68 which is concentric to bore 46 when installed in carrier 32 and a lower chordal portion 70 in which there is longitudinally provided an arcuate channel 72 which has the same radius as bore 46 and is concentric therewith. The cam slots 66, 66' and 66'' in the cam inserts 60 extend outwardly therethrough from channel 72 and are respectively provided with front ends 71, 71' and 71'' and rear ends 73, 73' and 73''. Each of the cam slots 66, 66' and 66'' progresses through an angle of 45° so that front member 42 may be similarly rotated between the lock and unlock positions whichever one of the cam slots is selectively installed in carrier 32. The rear ends 73, 73' and 73'' of the cam slots are all similarly positioned relative to the rear end of the cam inserts 60 because the retracted position of bolt 34, wherein such bolt is in battery and carrier 32 is in contact with barrel extension member 18, must always be the same. However, the angular development or pitches of the cam slots 66, 66' and 66'' vary, as is best shown in Figs. 11–13, for a purpose to be explained hereinafter, and with a decrease in the pitches of the cam slots the distances between the rear ends 73, 73' and 73'' and the front ends 71, 71' and 71'' corresponding thereto are proportionately increased so that the extended position of bolt 34 in carrier 32 varies with the pitches of the cam slots.

It is obvious that the velocity of carrier 32 when energized by either operating rod 26 or the pair of springs 28 is affected by the pitch of the cam slot engaged by follower 64 with the velocity of the carrier being decreased proportionately to an increase in the pitch of the cam slot. Therefore, as the firing rate of firearm 12 is determined in large part by the velocity of carrier 32, the cam slots 66, 66' and 66'' have different predetermined pitches so that the velocity of the carrier and thereby the firing rate of firearm 12 may be selectively varied by changing the cam inserts 60 in the carrier. In the present embodiment, the pitches of cam slots 66, 66' and 66'' are predetermined to respectively control the firing of firearm 12 at a fast, intermediate and slow rate. The selected cam insert 60 is replaceably secured in carrier 32 by means of a transversely disposed key 74 which is slidingly received by an aperture 76 in the carrier and a keyway 78 in the cam insert.

Rear member 44 carries a sear 80 which releasably holds a conventional firing pin device (not shown) in bolt 34 and, therefore, as such sear must be maintained in a vertical position during the reciprocation of bolt 34 such rear member is restrained from rotational displacement by a pair of integral lugs 82 which are slidingly received by mating ways 84 longitudinally disposed in the walls of bore 46, as best shown in Fig. 10. A longitudinal mouth portion 83 through the underside of carrier 32 provides a clearance for the passage of sear 80 when rear member 44 moves relative to the carrier.

When bolt 34 and carrier 32 travel together in receiver 14, the bolt is disposed in the extended position thereof relative to the carrier and is releasably locked in such extended position by a transversely disposed lock 86. Such lock 86 is of rectangular cross-section and is slidingly mounted through carrier 32 as hereinafter described for sliding actuation between a lock and an unlock position.

Lock 86 is disposed so as to transverse bore 46 immediately rearward of bolt 34, when the bolt is in the extended position, and is contactable by the rear end of rear member 44 to block such bolt in such position. Provided through the underside of lock 86 is an arcuate clearance 88 which, when lock 86 is in the unlock position, is in alignment with bolt 34 to unblock the bolt so that carrier 32 may move forwardly relative thereto. As is best shown in Figs. 5 and 6, lock 86 is moved in the illustrated preferred embodiment from right to left when actuated from the lock to the unlock position. Therefore, to provide means for actuating lock 86 between the lock and unlock positions, the length thereof is arranged to be greater than the section of carrier 32 through which the lock is mounted so that a portion thereof extends beyond the outside of the carrier. Clearance 88 is so disposed in lock 86 that the right end thereof extends from the right side of carrier 32 when the lock is in the lock position. As bolt 34 is locked in the extended position between the point in the travel of carrier 32 wherein bolt 34 is picked up thereby during rearward travel of the carrier and the point wherein the bolt is to be released therefrom when returned to battery position to permit continued forward travel of the carrier relative to the bolt, a channel 90 is provided along the right side of the inner wall of receiver 14 to slidingly receive such extending portion of lock 86. The front end of channel 90 is terminated by an inwardly inclining ramp 95, as best shown in Fig. 9, which engages the right end of lock 86 to cam the lock to the unlock position when head portion 48 of bolt 34 is adjacent battery position. As lock 86 is moved to the unlock position, the left end thereof is extended beyond the periphery of carrier 32 on the opposite side thereof and is received by a channel 94 extending longitudinally along the left side of the inside wall of receiver 14. Channel 94 is terminated at the rear end by a cam 92, as best shown in Fig. 9, which engages the left end of lock 86 to cammingly move the lock to the lock position thereof when carrier 32 is moved rearwardly under the influence of operating rod 26 to where bolt 34 is in the extended position relative to carrier 32.

As has been explained hereinbefore, the extended position of bolt 34 relative to carrier 32 varies with the lengths of the cam slots 66, 66' and 66", and, therefore, the difference in the extended positions are compensated for in the locking of bolt 34 to carrier 32 by providing three laterally disposed apertures 96 through the carrier for slidably receiving lock 86, and the apertures are longitudinally spaced according to the extended positions of the bolt as determined by the lengths of the cam slots 66, 66' and 66". Lock 86 passes slidingly through the selected one of the cam inserts 60 by means of a transverse hole 97 which is positioned in each of the cam inserts a similar predetermined distance from the front ends 71, 71' and 71".

Buffer assembly 30, which stops the recoil flight of bolt assembly 24 when the recoil position thereof is reached, includes an outer buffer 98 which is composed of a hub portion 100 and a circular flange 102 extending therefrom for contact by the rear end of carrier 32. A pad 104 of resilient material is provided on the front face of flange 102 to cushion the contact between outer buffer 98 and carrier 32.

In order to prevent damage to follower 64 and/or cam slot 66 by the inertial impact therebetween when carrier 32 is stopped, buffer assembly 30 also includes an inner buffer member 106 which is axially mounted within hub portion 100 so as to be extendable into the rear end of bore 46 to contact the rear end of bolt 34 simultaneously with the contact of outer buffer member 98 by carrier 32. The front end of inner buffer member 106 is faced with a pad 108 of resilient material to cushion the contact between such inner buffer member and bolt 34.

As the extended position of bolt 34 in carrier 32 is varied according to whether cam slot 66, 66' or 66" is installed in the carrier, inner buffer member 106 is mounted in hub portion 100 for selective adjustment to three positions, respectively corresponding to the extended positions as determined by such cam slots. The adjustment is made by means of a pair of lugs 110 which extend diametrically from such inner buffer member to be rotatably received by one of three annular grooves 112 longitudinally spaced in hub portion 100. The lugs 110 are selectively receivable by the grooves 112 through communicating longitudinally disposed grooves 114 in hub portion 110, as shown in Fig. 4.

A spring-biased plunger 116 is mounted in hub portion 100 for releasable engagement with a mating hole 118 in inner buffer member 106 to restrain the rotational displacement of such inner buffer assembly after the lugs 110 are rotated into engagement with the selected one of the grooves 112.

Thus, when firearm 12 is to be fired at a slow rate, the cam insert 60 with cam slot 66" is installed in carrier 32 and, therefore, as such cam slot is the shortest of the three, lock 86 is mounted in the aperture 96 which is the farthest from the front end of the carrier and the lugs 110 are installed in the rearmost one of the grooves 112.

When fire arm 12 is ready to be fired, head portion 48 is in the locked battery position thereof wherein the bayonet lugs 52 thereon are engaged with the bayonet lugs 54 in extension member 18 and bolt 34 is in the retracted position thereof in carrier 32. Upon discharge of a cartridge in barrel 16, operating rod 26 is actuated against carrier 32 which is accelerated thereby to recoil position. As carrier 32 moves rearwardly, bolt 34 is held against longitudinal displacement by the engagement of the bayonet lugs 52 and 54 and, therefore, cam slot 66" is moved along follower 64 to cammingly rotate front member 42 to the unlock position thereof.

By the time that front end 71" of cam slot 66" is adjacent follower 64 and bolt 34 is in the extended position thereof relative to carrier 32, front member 42 is rotated to the unlock position so that bolt 34 is free to be picked up by the carrier when the follower engages such front end of the cam slot. At the same time, the left end of lock 86 contacts ramp 92 at the end of channel 94 to cam the lock to the lock position so that bolt 34 is secured against rearward displacement from the extended position thereof in carrier 32.

When bolt assembly 24 reaches recoil position, the rearward flight thereof is resiliently stopped by the contact of carrier 32 with outer buffer 98 and bolt 34 with inner buffer member 106. During the recoil flight of bolt assembly 24, the springs 28 are energized to return the bolt assembly to forward battery position. As bolt assembly 24 moves forwardly in receiver 14 under the bias of springs 28, a cartridge is removed from magazine 20 and moved forwardly into barrel 16. When the cartridge is fully chambered in barrel 16 and the breech end thereof is closed by head portion 48, the right end of lock 86 contacts ramp 95 which terminates the front end of channel 90 to cammingly move the lock to the unlock position so that carrier 32 may continue forwardly, relative to bolt 34, to move cam slot 66" over follower 64 and thereby rotate front member 48 to the lock position to ready firearm 12 for firing.

From the foregoing, it is clearly apparent that there is herein provided a bolt assembly of the carrier-bolt type which provides a simple means for selectively regulating the firing rate of a firearm, which enables the carrier to be made from noncritical or light metals as the cam slot is formed in a separate insert member, and which provides an easy and an inexpensive way for forming the cam slot in such a bolt assembly.

Although a particular embodiment of the invention has been described in detail herein, it is evident that many variations may be devised within the spirit and scope thereof and the following claims are intended to include such variations.

I claim:

1. The combination including a receiver for a firearm, a nonrotatable carrier slidingly disposed in the receiver, a bolt telescopically mounted in said carrier, and a plurality of cam means selectively mounted in said carrier for sliding engagement by a cooperating follower on said bolt for converting relative longitudinal movement therebetween to rotation of said bolt and for selectively regulating the firing rate of the firearm.

2. The combination including a receiver for a firearm, a nonrotatable carrier slidingly disposed in the receiver, a bolt telescopically mounted in said carrier, a follower mounted to the outside of said bolt, and a selected one of a plurality of cam inserts respectively provided with a cam slot, each of said cam inserts being selectively installable in said carrier to slidingly engage said cam slot in the selected one of said cam inserts with said follower for converting longitudinal movement of said carrier relative to said bolt to rotation of said bolt, and said cam slots having pitches of different values for selectively regulating the firing rate of the firearm according to the pitch of said cam slot in the selected one of said cam inserts.

3. The combination including a receiver for a firearm, a nonrotatable carrier slidingly disposed in the receiver, a bolt telescopically mounted in said carrier, one of a plurality of cam inserts selectively installable in said carrier adjacent said bolt, a cam slot having an angular displacement of a predetermined value in each of said cam inserts, a follower mounted to said bolt for sliding engagement with said cam slot in the selected one of said cam inserts for converting relative longitudinal movement between said carrier and bolt to an angular displacement of said bolt similar to the angular displacement of said cam slot and limiting the movement of said carrier relative to said bolt to reciprocation between an extended and a retracted position, said cam slots being provided with pitches of different values to selectively regulate the firing rate of the firearm and with different lengths corresponding to the pitches, and said cam slots being disposed in said cam inserts so that the retracted positions of said bolt are similar while the extended positions thereof in the carrier vary with the lengths of said cam slots, and selective means for releasably locking said bolt against displacement from the extended position respective to said cam slot in the selected one of said cam inserts.

4. The combination as recited in claim 3 wherein said selective means includes a lock member, a plurality of apertures equal to the number of said cam inserts transversely disposed in said carrier rearwardly of said bolt to selectively receive said lock for sliding actuation between a lock and an unlock position, said apertures being longitudinally spaced in said carrier according to the extended positions of said bolt for selectively positioning said lock member in said carrier so as to releasably block said bolt in the extended position thereof respective to said cam slot in the selected one of said cam inserts, and a clearance in said lock member disposed for alignment with said bolt when said lock member is in the unlock position to release said carrier from said bolt for longitudinal movement relative thereto.

5. The combination including a receiver for a firearm, a carrier slidingly disposed in the receiver, a bolt slidingly mounted in an axial bore through said carrier for telescopic movement therein, a plurality of cam inserts each being selectively installable in said carrier adjacent said bolt, a cam slot in each of said cam inserts, a follower mounted to said bolt for sliding engagement with said cam slot in the selected one of said cam inserts for converting longitudinal movement of said carrier relative to said bolt to rotation thereof, a rear end terminating the rear of each of said cam slots, said rear ends being similarly disposed in said cam inserts, a front end terminating the front of each of said cam slots and disposed for contact by said follower to connect said bolt to said carrier for rearward travel therewith when said bolt is in an extended position, said cam slots being provided with various predetermined pitches to selectively regulate the firing rate of the firearm and with varied lengths corresponding to the various pitches to vary the positions of said front ends relative to said rear ends corresponding thereto, lock means selectively mounted transversely through said carrier for lateral movement between a lock and an unlock position to releasably lock said bolt against retracted displacement from the extended position thereof respective to said front end of said cam slot in the selected one of said cam inserts, and cam means disposed in said receiver for contact by said lock means during reciprocation of said carrier in said receiver for actuating said lock means between the lock and unlock positions.

6. The combination including a receiver for a firearm, a carrier slidingly disposed in the receiver for reciprocation between a forward and a recoil position, a bolt telescopically mounted in said carrier, a plurality of cam inserts respectively and selectively installable in said carrier adjacent said bolt, a cam slot disposed in each of said cam inserts, a follower mounted to said bolt for sliding engagement with said cam slot in the selected one of said cam inserts for converting longitudinal movement of said carrier relative to said bolt to rotation of said bolt and for limiting rearward movement of said carrier relative to said bolt when said bolt is in an extended position in said carrier, said cam slots being provided with various predetermined pitches to selectively regulate the firing rate of the firearm and with varied lengths corresponding to the various pitches, said cam slots being disposed in said cam inserts so that the extended positions of said bolt in said carrier vary with the lengths of said cam slots, lock means selectively mounted transversely through said carrier for lateral movement between a lock and an unlock position to releasably lock said bolt to said carrier in the extended position respective to said cam slot in the selected one of said cam inserts, and a buffer assembly mounted in the rear end of the receiver to resiliently stop said bolt assembly in the recoil position, said buffer assembly including an outer buffer contactable by the rear end of said carrier, an inner buffer member contactable by the rear end of said bolt, and means for adjusting said inner buffer member respective to said outer buffer to contact said bolt simultaneously with the contact of said outer buffer by carrier according to the extended position of said bolt respective to said cam slot in the selected one of said cam inserts.

7. The combination including a receiver for a firearm, a carrier sliding disposed in the receiver, a bolt slidingly mounted in an axial bore through said carrier for telescopic movement therein, a plurality of cam inserts each being selectively installable in said carrier adjacent said bolt, a cam slot in each of said cam inserts, a follower mounted to said bolt for sliding engagement with said cam slot in the selected one of said cam inserts for converting longitudinal movement of said carrier relative to said bolt to rotation thereof, a rear end terminating the rear of each of said cam slots with said rear ends being similarly disposed in said cam inserts, a front end terminating the front of each of said cam slots and disposed for contact by said follower during rearward movement of said carrier to connect said carrier to said bolt when in an extended position relative thereto, said cam slots being provided with various predetermined pitches to selectively regulate the firing rate of the firearm and with varied lengths corresponding to the various pitches to vary the positions of said front ends relative to the corresponding ones of said rear ends, lock means selectively mounted transversely through said carrier for lateral movement between a lock and an unlock position to releasably lock said bolt against retracted displacement from the extended position thereof respective to said front end of said cam slot in the selected one of said cam inserts, cam means disposed in said receiver for contact by said lock means during reciprocation of said carrier in said receiver for actuating said lock means between the lock and unlock positions, and a buffer assembly mounted in the rear end of the receiver, said buffer assembly including an outer buffer provided with a hub portion and a flange mounted thereto for contact by said carrier when in the recoil position, an inner buffer member slidingly mounted through said hub portion for extension into said bore to contact said bolt, and a pair of lugs extending from said inner buffer member for selective engagement with a plurality of grooves equal to the number of said cam inserts longitudinally spaced in said hub portion to selectively adjust said inner member for contact by said bolt simultaneous with the contact of said outer buffer by said carrier according to the positions of said front ends in said cam slots.

8. The combination including a receiver for a firearm, a nonrotatable carrier slidingly disposed in said receiver, a bolt telescopically mounted in said carrier for relative longitudinal movement during cyclic operation of the firearm, a follower mounted on said bolt, a first cam insert mountable in said receiver adjacent the path of movement of said bolt, a first cam slot of predetermined pitch arranged in said first cam insert for sliding engagement by said follower to convert longitudinal movement of said carrier relative to said bolt to rotary movement thereof and to predeterminably control the velocity of such movement proportionate to the pitch of said first cam slot for controlling the operating rate of the firearm, a second cam insert selectively mountable in said receiver in place of said first cam insert, and a second cam slot arranged in said second cam insert for sliding engagement by said follower, said second cam slot having a predetermined pitch which is greater than that of said first cam slot for decreasing the rate of the firearm when said first cam insert is replaced by said second cam insert in said receiver.

9. The combination as recited in claim 8 wherein said first and second cam slots are each provided with closed ends which are engageable by said follower for limiting the relative movement of said carrier and bolt to reciprocation between relative extended and telescoped relationships and wherein the length of said second cam slot is shorter than that of said first cam slot according to the increase in the pitch thereof over that of said first cam slot and the extended relationship of said bolt and carrier is determined by the lengths of said first and second cam slots, and including in the combination selective means for releasably locking said bolt and carrier in the extended relationship.

10. The combination as recited in claim 8 wherein said first and second cam slots are each provided with closed ends which are engageable by said follower for limiting the relative movement of said carrier and bolt to reciprocation between relative extended and telescoped relationships and wherein the length of said second cam slot is shorter than that of said first cam slot according to the increase in the pitch thereof over that of said first cam slot and the extended relationship of said bolt and carrier is determined by the lengths of said first and second cam slots, and including in the combination a buffer assembly which is adjustable to simultaneously contact both said carrier and said bolt when said bolt is in the extended position.

References Cited in the file of this patent

UNITED STATES PATENTS

| | | |
|---|---|---|
| 1,359,045 | Fisher | Nov. 16, 1920 |
| 2,424,264 | Yorks | July 22, 1947 |
| 2,771,819 | Morse et al. | Nov. 27, 1956 |

FOREIGN PATENTS

| | | |
|---|---|---|
| 228,678 | Switzerland | Dec. 1, 1943 |